UNITED STATES PATENT OFFICE 2,549,924

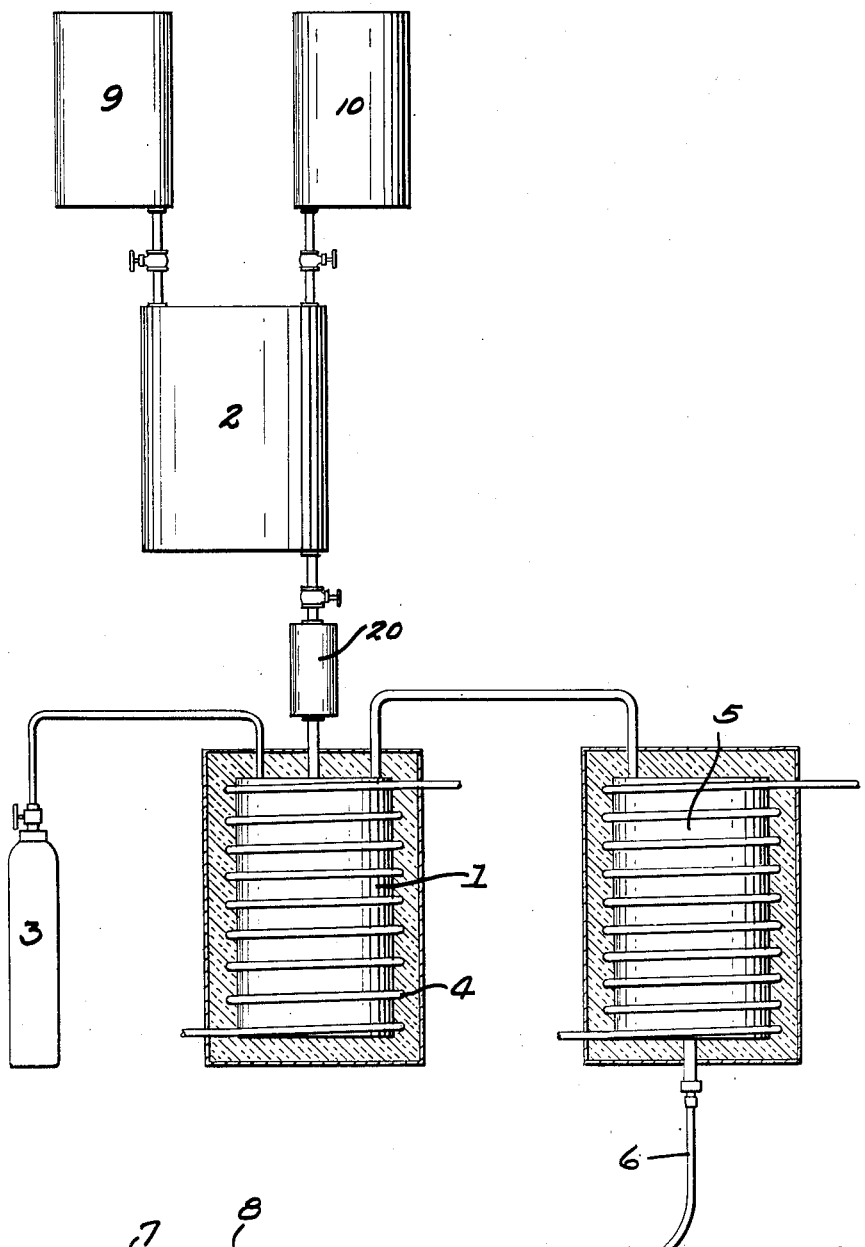

CURING OF MEAT

Henry Conrad Olien and Norman Stanley Geisenheimer, Milwaukee, Wis., assignors to Cudahy Brothers Company, Cudahy, Wis., a corporation of Wisconsin Application August 20, 1947, Serial No. 769,714

5 Claims. (Cl. 99—159)

This invention relates to improvements in the curing of meat as, for example, the curing of ham.

Objects of the invention include the reduction of curing time; provision of a more satisfactory and completely germicidal pickle; improvements in flavor; improvement in tenderizing and retardation of the oxidation of fats.

More specifically, it is our purpose to accomplish the foregoing objectives and achieve other advantages in the pickling of meat by injecting into the circulatory system of a piece of meat a heavily carbonated pickle or brine which desirably includes at least a proportion of a previously used second pickle or other protein in solution, whereby the injected carbonated solution will form a lasting foam which, for a substantial period, will approximately double the volume of the injected pickle for a given weight, thereby not only increasing the pressure but creating prolonged effervescence to assist such pickle to penetrate throughout the flesh, and also greatly reducing the rate at which the injected pickle escapes.

It is extremely important to the achievement of the objects of this invention that the stabilization of the foamy or creamy pickle and its retention in the meat be prolonged for as long as possible, the resulting increased penetration giving improvement in color, flavor and uniformity of salt distribution and fat stability. The manner in which we accomplish these objectives will be more apparent from the following disclosure of the invention.

A wide variety of apparatus may be employed in connection with the practice of the invention. That disclosed is purely by way of exemplification, and the disclosure is merely diagrammatic.

The drawing shows diagrammatically in side elevation apparatus for the practice of my invention.

In the carbonator 1, pickle from the storage tank 2, filtered at 20, is carbonated, preferably at a pressure of 50 pounds or more to the square inch, by carbon dioxide gas from a source 3. Either before or during carbonation, the pickle is reduced to a temperature of about 35° F., or close to freezing, by means of the refrigeration coils 4. The pressure and temperature of the carbonated pickle are maintained in the tank 5, preferably for a considerable period of time, after which the carbonated pickle is delivered through the hose 6 to the injection nozzle 7, whereby the operator introduces it subject to the control of valve 8, into the blood vessels, preferably the arteries, of the piece of meat to be pickled. In a ham there are three main arteries, each of which is preferably injected separately.

Except for preferred addition of protein as hereinafter explained, any pickle formula may be used. A preferred formula for the basic pickle is as follows:

| | |
|---|---|
| 65° salometer | 17.5% salt |
| Sugar | .232# per gallon |
| Nitrate | .0144# per gallon |
| Saltpeter | .009# per gllaon |

The amount of pickle injected is preferably about the same by weight as that which is commonly injected where no carbonation is employed. The carbonation causes the pickle to foam or bubble as it issues from the nozzle 7, whereby its volume is increased about 100%. If only freshly prepared pickle is employed, a great reduction in volume occurs immedately due to the rapid effervescence of the gas leaving the pickle. If any edible protein is dissolved in the pickle, however, the foam will persist over a very considerable period, even though the amount of dissolved protein is small. Examples of suitable edible proteins other than that preferred and hereinafter described are: gelatin, blood, whey, meat extract, albumen, and the various vegetable proteins.

A convenient and preferred source of edible protein is a pickle which has previously been used for other meat curing operations. It has long been known that it is advantageous to pasteurize and re-use used pickel to save enzymes, proteins and other valuable and flavorful ingredients of the meat in solution therein. However, in the present process, the re-use of a part of the used pickle not only accomplishes these savings but brings about entirely new results because the protein in the used pickle prolongs greatly and unexpectedly the period for which the pressure of the expanded pickle will be maintained within the meat.

In order to achieve these advantages, we may mix in the supply tank 2 a portion of used pickle from vat 9 with a proportion of fresh pickle from vat 10. The proportions are not critical. We have used successfully as low as 1% of used pickle to 99% of fresh pickle and still maintained the desired permanence of the foam. It is also possible to use 100% used pickle. In practice, we prefer to employ about 25% used pickle and about 75% of fresh pickle in making up the mixture in tank 2.

The average pumping pickle formula would be in the neighborhood of a 65-deg. salometer—that is, about 17% salt; sugar .232 lb. per gallon; nitrate .0144 per gallon; saltpeter .009 lb. per gallon. The average second pickle would be a reduction of approximately 15 to 20% of these ingredients, plus an addition of meat extract proteins in the neighborhood of .8% to 1%.

When used curing solutions, having a pH of about 6, are carbonated under about 50 pounds pressure to the square inch and held at this pressure and at a temperature of approximately 35° F. for sixteen to twenty-four hours, the pH is lowered to approximately 4.6, changing the iso-electric point of the proteins present, causing them to floc. The germicidal value of this treatment is equal to or greater than pasteurization. After the prescribed holding period, the solution can be filtered without heating and used immediately without further cooling. This eliminates the necessity of heating and cooling, as in some processes of re-using used pickle. At the same time, we produce a clear, chilled, stabilized, curing solution of low bacterial count and low pH. The low pH of the treated stabilized curing solution has important advantages when injected into the arterial system of the ham, due to the great germicidal action with which the solution flushes out the arteries. The solution is injected into each artery. The needle is then allowed to remain in the artery for a few seconds, or until the desired weight of pickle has been added.

Whereas the ordinary uncarbonated pickle, injected into a ham, sprays from the surface of the ham in fine jets and almost immediately loses the pressure at which it was injected, the carbonated effervescent pickle of the present invention does not issue in the form of spray but leaks slowly from the surface in a foamy milky stream. This effect is particularly evident when protein, such as used pickle, is present in the carbonated solution. The bubbles preclude the rapid issue of the liquid in the form of a spray and preclude return through the artery. This holds the pressure of the solution within the ham for a substantial period, effervescence continuing long after needle withdrawal.

The prolonged period of pressure, and continued effervescence in the tissues causes greatly improved penetration, adding to improvement in color, flavor and uniformity of salt distribution.

Pronounced improvements in fat stability have been noted as a result of this process. For example, tests have been made using right and left hams from identical hogs. The right hams were pumped with uncarbonated solution and the left hams with the same solution carbonated. All hams were then processed as usual and after smoking were held at a temperature of 55° F. for a period of five weeks. Samples of fat taken from identically corresponding points on the respective hams were then rendered in the laboratory. The free fatty acid content of the fat taken from ham cured with uncarbonated curing solution was 1.5%, whereas that taken from ham treated with carbonated curing solution was .4%.

Similarly identical samples were tested for tenderness, using a "precision penetrometer". The sample from ham pumped with carbonated curing solution was 15% more tender than the untreated sample.

By the treatment, the pH of each treated ham as a whole was reduced to about 5.0. Color and flavor, as well as tenderness, were improved.

Flavor, tenderness and color comparable to, or superior to, those resulting from present commercial curing methods can be achieved by our process even if the hams are smoked immediately after injection without any curing period whatever.

We claim:

1. The method of preparing a pickle for the injection curing of meat, such method consisting in carbonating a pickle solution containing percentage of at least approximately 1% of used pickle, holding the carbonated solution under a pressure in the neighborhood of 50 pounds to the square inch and the temperature in the neighborhood of 35° F. for 16 to 24 hours, whereby the pH is lowered to approximately 4.6, changing the iso-electric point of the proteins present, causing them to flock, and filtering the solution unheated.

2. The method recited in claim 1 in further combination with the step of injecting the carbonated and filtered pickle into the vascular system of a piece of meat to be cured, the protein content of the used pickle component causing, in the presence of carbonation, a foamy bubbling of the solution which precludes leaking from the meat in the form of spray and maintains the pressure in the meat for a substantial period during which effervescence continues subsequent to injection.

3. The method of injection curing meat which comprises the addition of edible protein to freshly prepared pickle solution, the carbonation of such solution under pressure and the injection of the carbonated protein-containing pickle into the vascular system of a piece of meat for a few seconds, until the desired weight of pickle has been added to the meat, and the interruption of such injection when the desired weight of pickle has been added, the protein component of the pickle reacting in the presence of the carbonation to prolong effervescence for a substantial period after injection ceases and to produce a foamy milky stream which issues from the meat in lieu of spray, whereby to maintain within the meat a substantial portion of the pressure of injection and to improve penetration into the tissue.

4. The method recited in claim 3 in which the protein added is selected from the group which consists of used pickle, gelatine, blood, whey, meat extract, albumin and vegetable proteins.

5. The method recited in claim 3 in which the carbonation is continued under about 50 pounds pressure to the square inch at a temperature of approximately 35° F. for 16 to 24 hours until the pH of the pickle is lowered to approximately 4.6 and the proteins present are caused to flock, together with the further step of filtering the flock from the pickle without heating, the pickle being thereupon injected as aforesaid without cooling.

HENRY CONRAD OLIEN.
NORMAN STANLEY GEISENHEIMER.

REFERENCES CITED

The following references are of record in the file of this patent:

UNITED STATES PATENTS

| Number | Name | Date |
|---|---|---|
| 682,572 | Schlarb | Sept. 10, 1901 |
| 1,052,862 | Trescott | Feb. 11, 1913 |
| 2,054,624 | Griffith | Sept. 15, 1936 |
| 2,084,864 | Paddock | June 22, 1937 |
| 2,241,030 | Hess | May 6, 1941 |
| 2,442,663 | Rinehart | June 1, 1948 |